(12) United States Patent
Yoshikawa

(10) Patent No.: US 8,033,741 B2
(45) Date of Patent: Oct. 11, 2011

(54) OPTICAL TRANSCEIVER WITH ENHANCED EMI TOLERANCE

(75) Inventor: Satoshi Yoshikawa, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 12/792,213

(22) Filed: Jun. 2, 2010

(65) Prior Publication Data

US 2010/0310215 A1    Dec. 9, 2010

(30) Foreign Application Priority Data

Jun. 4, 2009    (JP) .................................. 2009-135168

(51) Int. Cl.
*G02B 6/36* (2006.01)
*H01R 13/648* (2006.01)
(52) U.S. Cl. .................... 385/92; 439/607.01; 439/607.2
(58) Field of Classification Search ...................... 385/92
See application file for complete search history.

(56) References Cited

U.S. PATENT DOCUMENTS

| 7,059,887 | B1 * | 6/2006 | Liu ............................... 439/372 |
| 7,406,230 | B2 | 7/2008 | Yoshikawa |
| 7,491,090 | B2 | 2/2009 | Oki et al. |
| 2007/0167077 | A1 * | 7/2007 | Mizue ........................... 439/607 |
| 2008/0233799 | A1 * | 9/2008 | Winker et al. ................. 439/607 |
| 2009/0147493 | A1 * | 6/2009 | Wu ............................... 361/818 |
| 2009/0176409 | A1 | 7/2009 | Oki |
| 2009/0269077 | A1 * | 10/2009 | Sone et al. .................... 398/135 |

* cited by examiner

*Primary Examiner* — Uyen Chau N Le
*Assistant Examiner* — Chris Chu
(74) *Attorney, Agent, or Firm* — Venable LLP; Michael A. Sartori; Leigh D. Thelen

(57) ABSTRACT

A pluggable optical transceiver with an enhance EMI tolerance is disclosed. The optical transceiver provides an electrically conductive receptacle, a ground member made of metal sheet, and a cover also made of metal sheet. The ground member is assembled so as to surround a periphery of the receptacle. The cover provides a first bridge in a front portion thereof, while, the ground member provides fingers and a second bridge connecting the fingers in the tip portion. Fully setting the optical transceiver in the cage, the finger comes in contact with the inside of the cage and the first bridge comes in securely contact with the second bridge so as to shield a gap between the transceiver and the cage.

10 Claims, 6 Drawing Sheets

OPTICAL TRANSCEIVER WITH ENHANCED EMI TOLERANCE

BACKGROUND OF THE INVENTION

1. Filed of the Invention

The present invention relates to an optical transceiver, in particular, the invention relates to an arrangement to reduce EMI radiation leaked from the optical transceiver.

2. Related Background Art

One type of an optical transceiver has been known as a pluggable optical transceiver, in which the pluggable optical transceiver is set within a cage provided on the host board from the front opening of the cage. Typical arrangements of the pluggable optical transceiver and the cage have been disclosed in, for instance, the U.S. Pat. No. 7,491,090, the U.S. Pat. No. 7,406,230 and the U.S. 2009/0176409A.

The pluggable optical transceiver typically comprises a body, a receptacle, a ground member and a cover. The body installs semiconductor optical devices, such as semiconductor laser diode (hereafter denoted as LD) and semiconductor photodiode (hereafter denoted as PD), a circuit board electrically connected with the optical devices. The receptacle, which is provided in a front portion of the body, may couple optical devices with external optical fibers secured in an optical connecter set in the receptacle. The cover installs the body therein and is assembled with the receptacle. The ground member, which covers the outer peripheral of the receptacle, provides a plurality of fingers. Setting the optical transceiver in the cage, the fingers may come in securely contact with an inside of the cage. Thus, the EMI tolerance of the optical transceiver may be enhanced. As the transmission speed of the optical communication system increases, the EMI tolerance of the optical transceiver applicable in the system has been requested in higher degree, because a signal with higher frequency components is easily radiated out from the optical transceiver.

SUMMARY OF THE INVENTION

An aspect of the present invention relates to a pluggable optical transceiver primarily comprises a receptacle made of electrically conductive material, a metal cover and a electrically conductive ground member. The metal cover includes, in a front end thereof, a first bridge extending in a direction intersecting a longitudinal direction of the optical transceiver; and the ground member, which is assembled with the receptacle so as to surround the receptacle, includes a finer extending along the longitudinal direction and a second bridge provided in a tip of the finger. The second bridge extends in a direction substantially in parallel with the first bridge. A feature of the present invention is that the first bridge of the cover comes in contact with the second bridge of the ground member when the optical transceiver is fully set within the cage; then, two bridges may shield a gap caused between the receptacle and an inner surface of the cage.

The optical transceiver may provide a plurality of fingers in the ground member with a second tab between fingers, and a pocket in the receptacle. The second tab may be set within the pocket so as to shield a gap caused between the receptacle and the ground member. The optical transceiver may further provide a first tab in the cover. The first tab may press the second tab of the ground member set within the pocket; thus, the combination of the first and second tabs, and the pocket may securely shield the gap between the ground member and the receptacle, and between the cover and the ground member.

BRIEF DESCRIPTION OF THE DRAWINGS

The invention may be more completely understood in consideration of the following detailed description of various embodiments of the invention in connection with the accompanying drawings, in which.

DETAILED DESCRIPTION OF PREFERRED EMBODIMENTS

Next, preferred embodiments according to the present invention will be described as referring to accompany drawings. In the description of the drawings, the same element will be referred by the same numerals or the symbols without overlapping explanations.

Figure 1:
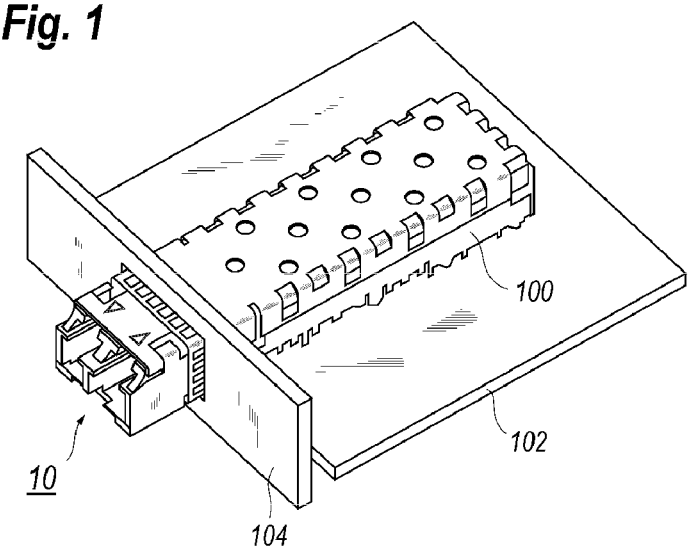
FIG. 1 is a perspective view showing a pluggable optical transceiver set within the cage.

FIG. 1 is a perspective view showing a pluggable optical transceiver set within the cage 100 on the host system. The cage 100, which is mounted on the board 102, exposes the front end thereof from an opening of the face panel 104 of the host system. The optical transceiver 10 is set within the cage 100 by inserting it through the opening in the face panel 104. The optical transceiver 100 provides two optical ports in the front end thereof, one of which is for receiving the first optical signal, while the other is for transmitting a second optical signal. Thus, the optical transceiver 100 shown in FIG. 1 performs the full synchronous optical communication.

Figure 2:
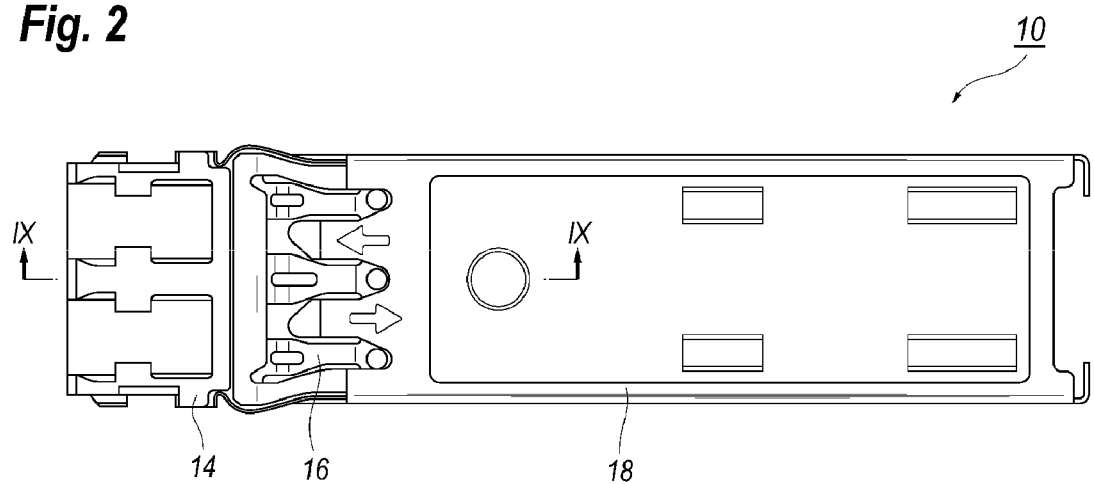
FIG. 2 is a plan view of the optical transceiver according to an embodiment of the invention.

FIG. 2 is a plan view of the optical transceiver according to an embodiment of the invention. The optical transceiver 10 provides, as already described, the receptacle 14, the ground member 16, and the cover 18. In the description presented below, the front indicates a direction where the receptacle 14 is provided with respected to the cover 18, while, the rear corresponds to a side where the cover is provided.

The body of the optical transceiver installs the semiconductor optical devices such as LD and PD, and a circuit board electrically coupled with the optical devices. The cover 18 sets the body of the optical transceiver therein.

Figure 3:
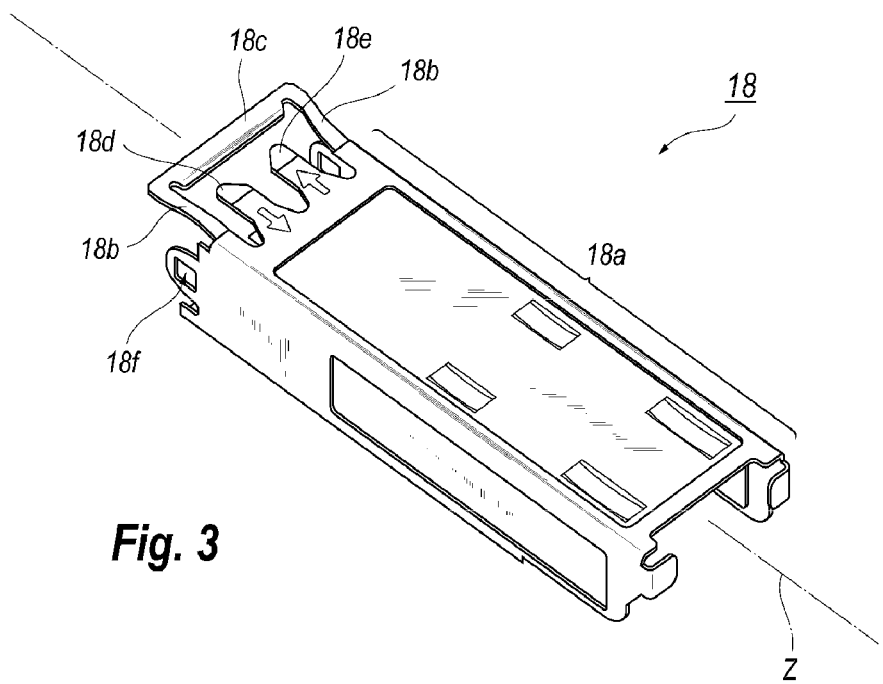
FIG. 3 is a perspective view of the cover.
Figure 4:
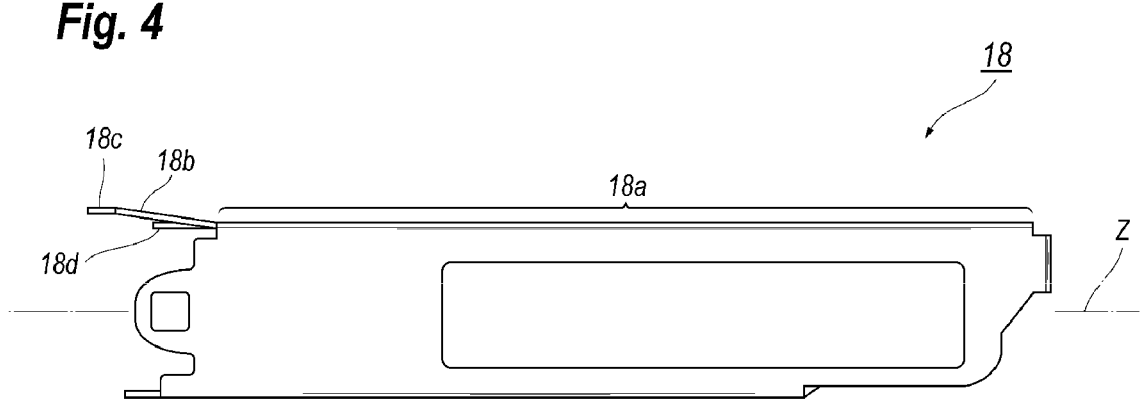
FIG. 4 is a side view of the cover.

FIG. 3 is a perspective view of the cover, and FIG. 4 is a side view of the cover 18. The cover 18 shown in FIGS. 3 and 4 may be formed only by cutting and bending a metal sheet without welding, soldering and so on. The cover 18 includes a primary portion 18a extending along the Z direction and having a rectangular cross section with respective openings in the front and rear end thereof. Within a space formed in the primary portion is installed with the circuit board.

The cover 18 further includes a pair of horns 18b, a first bridge 18c, and first tabs, 18d and 18e. The first bridge 18c is supported by the primary portion through respective horns. Specifically, the first bridge 18c extends in a direction crossing the longitudinal axis Z of the optical transceiver and connects with respective horns 18b at the end thereof. The horns 18b extends from the corner of the primary portion 18a along the longitudinal direction Z. The end portion of the horn 18b, to which the first bridge 18c is connected, is bent upward; accordingly, the level of the tip of the horn 18c positions above the ceiling of the primary portion 18a. Setting the optical transceiver 10 of the embodiment within the cage 100, the horn 18c may come in contact with the inside of the cage 100.

Two tabs, 18d and 18e, forwardly extends from the edge of the primary portion 18a and are surrounded by the horns 18b and the first bridge 18c. These tabs, 18d and 18e, as described later in the present specification, position below the second bridge 16e. In a case where the optical transceiver 10 is free from the cage 100, these tabs, 18d and 18e, position below the horns 18b and the first bridge 18c. The cover 18 provides an opening 18f in the front end of the side wall thereof. The receptacle 14 may be assembled with the cover by mating the projection 14a of the receptacle 14 with the opening 18f.

Figure 5:
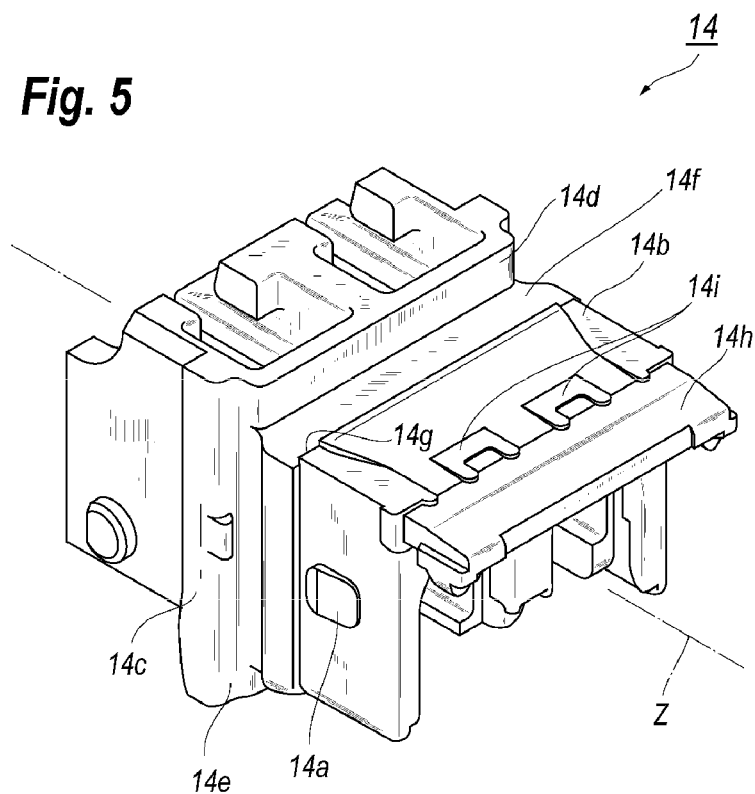
FIG. 5 is a perspective view of the receptacle.
Figure 6:
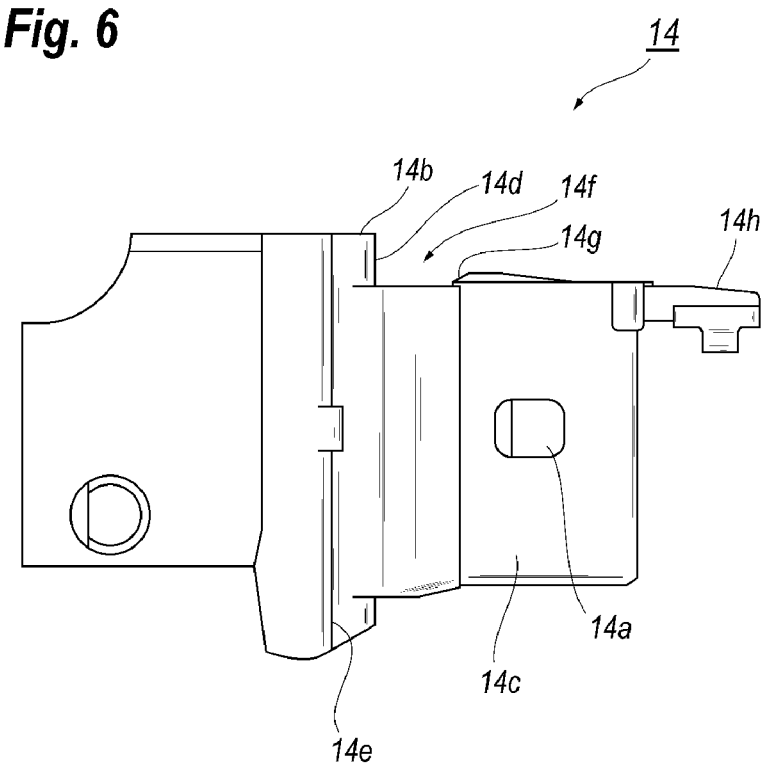
FIG. 6 is a side plan view of the receptacle.

FIG. 5 is a perspective view of the receptacle 14, while FIG. 6 is a side plan view of the receptacle 14. The receptacle 14, which may be made by die-casting of a metal or made of resin coated with metal, may optically couple the optical device installed in the primary portion 18a with the external optical fiber. The receptacle 14 includes a top 14b and a side 14c to provide a space extending along the direction Z to couple an optical connector that implements the optical fiber with the optical device. The projection 14a, which may mate with the opening 18f of the cover 18, is provided in the side 14c.

The top 14b and the side 14c each provides the stopper, 14d and 14e, that is a plane intersecting the longitudinal axis Z and facing rear. On the top 14b is formed with a groove 14f, while, the top 14b includes a slope 14g to define the groove 14f at the rear end thereof. Moreover, the top 14b provides an overhanging 14h at the rear end thereof. In a rear end of the receptacle 14 but the front of the overhanging 14h is formed with two pockets 14i that receive the tip of the second tab 16g of the ground member 16 as described later.

Figure 7:
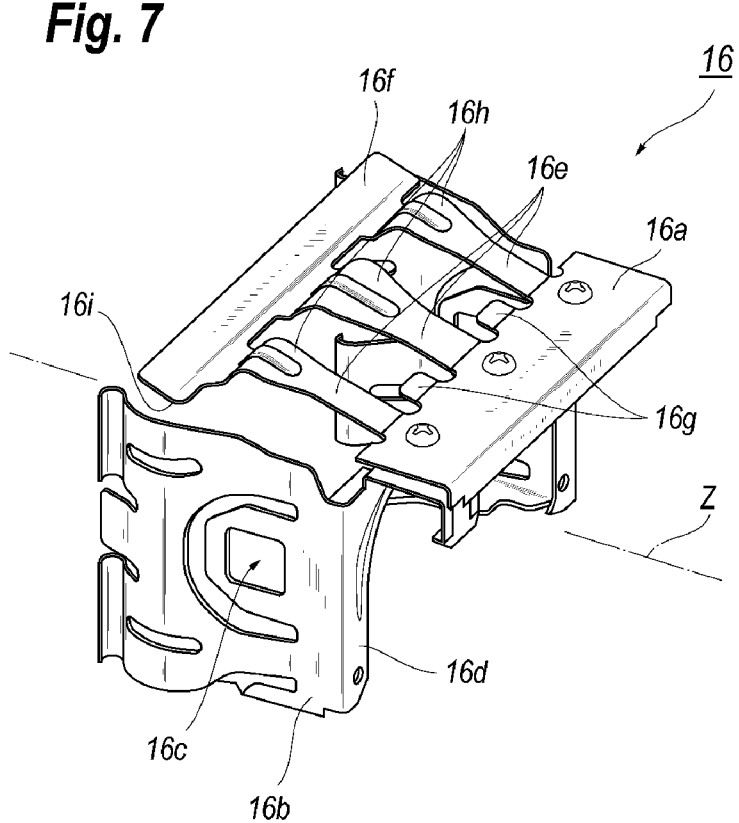
FIG. 7 is a perspective view of the ground member.
Figure 8:
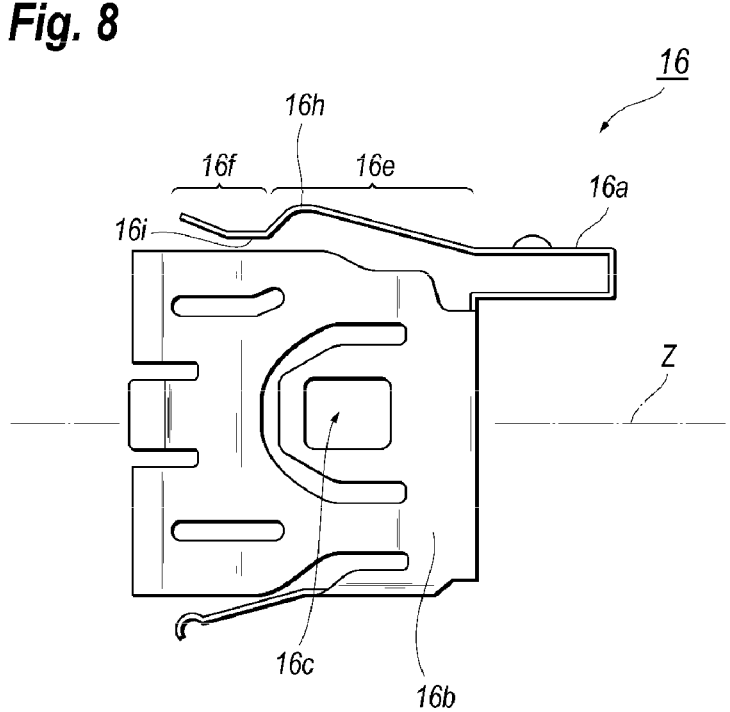
FIG. 8 is a side view of the ground member.

FIG. 7 is a perspective view of the ground member 16, while FIG. 8 is a side view of the ground member 16. The ground member 16 according to the present embodiment, which is to be assembled with the receptacle 14, may be also formed only by cutting and bending a metal sheet without welding or soldering. The ground member 16 includes a rear portion 16a which is bent twice so as to trace the overhanging 14h of the receptacle 14, and a side portion 16b with a shape tracing the side 14c of the receptacle 14. The side portion 16b provides an opening 16c that is to be mated with the projection 14a to assemble the ground member 14 with the receptacle 14. Thus, the assemble of the ground member 16 with the receptacle 14, and that of the cover 18 with the receptacle 14, may be carried out only by the fitting of the projection 14a with the opening, 16c or 18f, without welding, soldering and screwing. After the assembly of the optical devices with the receptacle 14, the rear wall 16d of the ground member 16 is put between the flange of the optical device and the rear wall of the receptacle 14.

The ground member 16 further provides a plurality of fingers 16e, the second bridge 16f, and the second tab 16g. The finger 16e forwardly extends from the front end of the upper sheet in the rear portion 16a along the longitudinal axis Z. The second bridge 16f extends to the direction intersecting the axis Z and connects the tip of the fingers 16e. Specifically, the finger 16e, upwardly extending from the upper sheet of the rear portion 16a and then being bent downwardly so as to form the convexity 16h, is connected with the second bridge 16f at the tip thereof. The second bridge 16f, first extending downwardly from the rear end thereof where the finger 16e is connected, is bent upwardly so as to form a hollow 16i. The finger 16e and the second bridge 16f integrally have a corrugated cross section with the convexity 16h and the hollow 16i, as shown in FIG. 8. Setting the optical transceiver 10 in the cage 100, the convexity 16h of the ground member 16 comes in securely contact with the inside of the cage 100, while, the hollow 16i of the second bridge 16f comes in securely contact with the receptacle 14.

The second tab 16g forwardly extends from the front end of the upper sheet in the rear portion 16a along the axis Z. The second tab 16f is to be set in the pocket 14i of the receptacle 14 after the ground member 16 is assembled with the receptacle 14.

Figure 9:
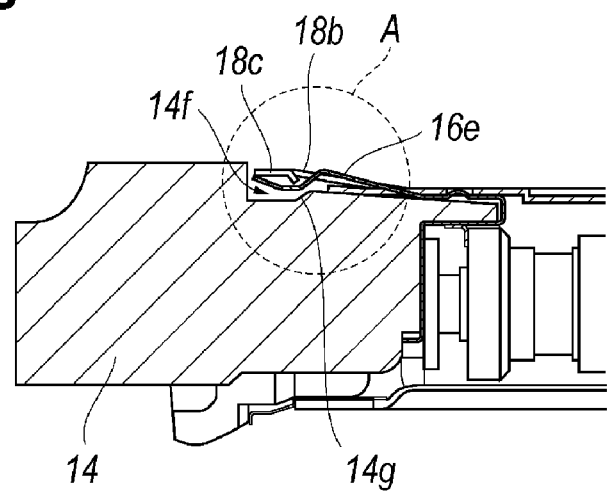
FIG. 9 is a cross section taken along the line IX-IX in FIG. 2.

Next will describe an arrangement of the receptacle 14, the ground member 16, and the cover 18 when the optical transceiver 10 is set within the cage 100. FIG. 9 is a cross section taken along the line IX-IX in FIG. 2, while, FIG. 10 magnifies a portion marked by a label "A" in FIG. 9, in which two conditions, the convexity 16h of the finger 16 comes in contact with the inside of the cage 100 and is apart therefrom are illustrated by a chain line and a solid line, respectively, and FIG. 11 also magnifies the portion "A" in FIG. 9, in which two conditions, in which the first bridge 18c comes in contact with the inside of the cage 100 and is apart therefrom are illustrated by a solid line and a chain line, respectively.

Figure 10:
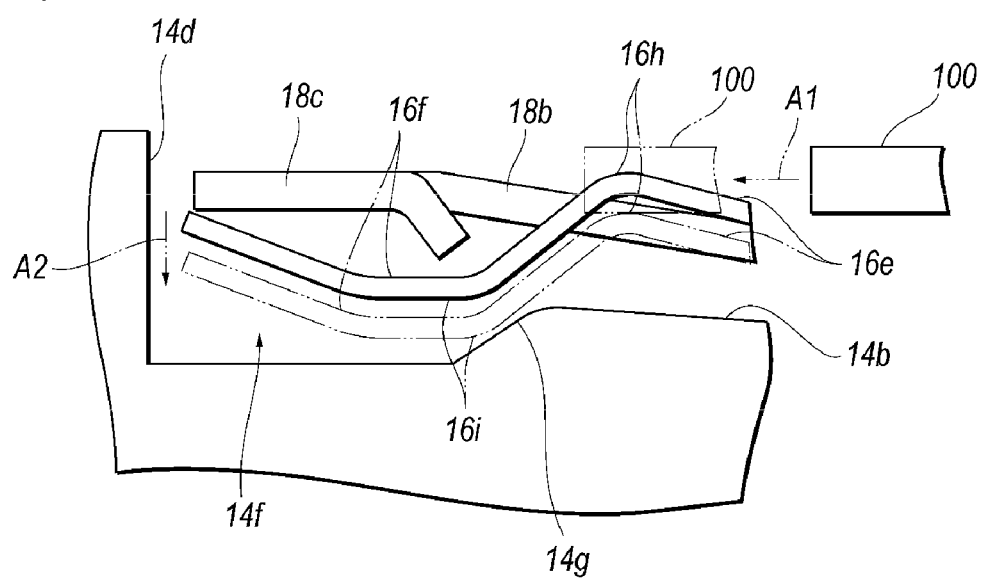
FIG. 10 magnifies a portion marked by a symbol "A" in FIG. 9, in which two conditions, the convexity of the finger comes in contact with the inside of the cage and is apart therefrom, are illustrated by a chain line and a solid line, respectively FIG. 11 also magnifies the portion "A" in FIG. 9, in which two conditions, the first bridge comes in contact with the inside of the cage and is apart therefrom, are illustrated by a chain line and a solid line, respectively.

As illustrated in FIGS. 9 and 10, when the optical transceiver 10 is free from the cage 100, the hollow 16i of the ground member 16 is slightly apart from the receptacle 14.

Setting the optical transceiver 10 within the cage 100 as illustrated in FIG. 10, which is denoted by an arrow A1, the convexity 16h of the finger 16e comes in contact with the inside of the cage 100, which presses the finer 16e and the second bridge 16f of the ground member 16 downward as shown by an arrow A2. Then, the hollow 16i of the second bridge 16f may come in contact with the slope 14g of the top 14b of the receptacle 14.

Figure 11:
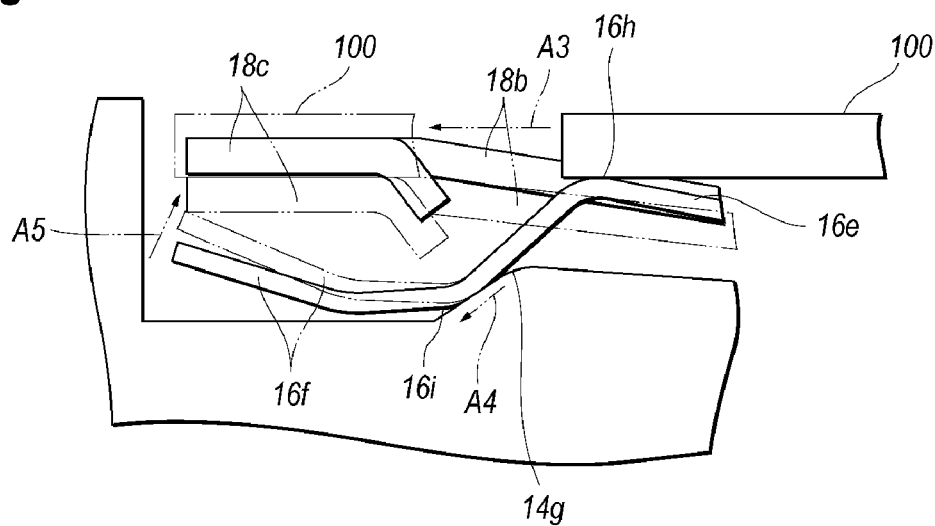

Further inserting the optical transceiver 10 into the cage 100 as illustrated by an arrow A3 in FIG. 11, the hollow 16i slides on the slope 14g downward as illustrated in an arrow A4; accordingly, the tip of the second bridge 16f is slightly lifted upward, denoted by an arrow A5. Still further inserting the optical transceiver 10 into the cage 100, the first bridge 18c of the cover 18 may come in securely contact with the inside of the cage 100, which presses not only the first bridge 18c but the horn 18b downward. Finally, setting the optical transceiver 10 in the defined position within the cage 100, the first bridge 18c pressed downwardly and the tip of the second bridge 16f lifted upwardly come in contact.

After the assembly of the ground member 16 with the receptacle 14, a slight gap is necessary between the cover 18 and the ground member 16 in order to further assemble the receptacle 14 with the cover 18. This slight gap may cause, or degrade the EMI tolerance in a conventional optical transceiver. On the other hand, the optical transceiver 10 according to the present embodiment shuts this gap by the first bridge 18c and the second bridge 16f coming in contact with the other, accordingly, the EMI tolerance of the optical transceiver 10 of the embodiment may be maintained in effective.

Moreover, the optical transceiver 10 of the embodiment provides a combination of the second tab 16g and the pocket 14 that receives the second tab 16g and the first tab 18d of the cover 18 overlaid on this combination may further suppress the degradation in the EMI tolerance.

Figure 12:
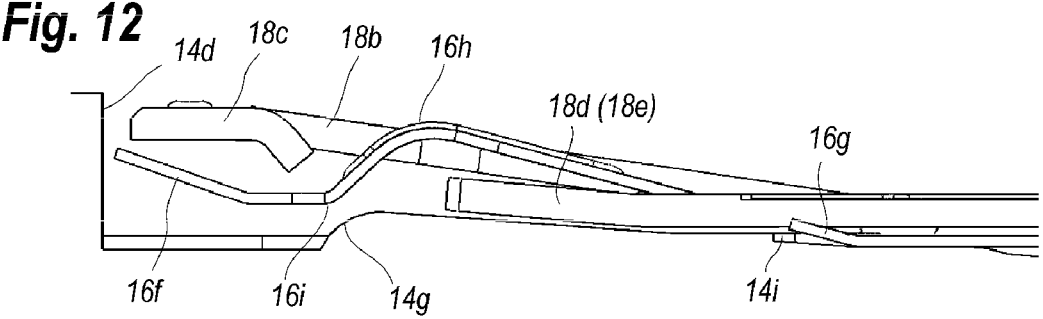
FIG. 12 schematically illustrates a positional relation between the first tab, the second tab and the pocket when the optical transceiver is fully set within the cage.

FIG. 12 schematically illustrates a positional relation between the first tab 18d, the second tab 16f and the pocket 14i when the optical transceiver 10 is fully set within the cage 100.

The second tab 16g is set in a space surrounded by the pocket 14i and the first tab 18d. The position of this space is between the roots of the finger 16e, where the countermeasure against the EMI tolerance should be firstly carried out. The optical transceiver 10 of the embodiment provides the double arrangement where the second tab 16f of the ground member 16 is set in the pocket 14i between the fingers 16e and the first tab, 18d and 18e, of the cover 18 presses the second tab 16f downward. Thus, the present optical transceiver 10 may perform the EMI tolerance even in positions between the fingers 16e of the ground member 16.

In the foregoing detailed description, the apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A pluggable optical transceiver to be set within a cage provided in a host system, comprising:
    a receptacle made of electrically conductive material and including a slope;
    a metal cover including a first bridge in a front end thereof, said first bridge extending in a direction intersecting a longitudinal direction of said optical transceiver; and
    an electrically conductive ground member surrounding a periphery of said receptacle, said ground member including a finger extending in said longitudinal direction and a second bridge connected on a tip of said finger, said second bridge extending in a direction substantially in parallel with said first bridge, said finger including a convexity, said second bridge including a hollow,
    wherein, when said optical transceiver is set within said cage, said convexity comes in contact with an inner surface of said cage, and said hollow comes in contact with said slope and slides thereon, and
    wherein said first bridge comes in contact with said second bridge when said optical transceiver is fully set within said cage.

2. The pluggable optical transceiver of claim 1,
    wherein said first bridge and said second bridge shield a gap between said receptacle and an inner surface of said cage when said optical transceiver is fully set within said cage.

3. The pluggable optical transceiver of claim 1,
    wherein said second bridge is lifted up to come in contact with said first bridge when said optical transceiver is fully set within said cage.

4. The pluggable optical transceiver of claim 1,
    wherein said finger and said second bridge integrally have an S-shaped cross section.

5. The pluggable optical transceiver of claim 1,
    wherein said cover includes a pair of horns each forwardly extending from a front corner of said cover, said first bridge connecting a tip of said horns.

6. The pluggable optical transceiver of claim 1,
    wherein said finger includes a plurality of fingers each extending in said longitudinal direction, said second bridge connecting a tip of said respective fingers.

7. The pluggable optical transceiver of claim 6,
    wherein said cover further includes a first tab, said ground member further includes a second tab, and said receptacle includes a pocket to receive said second tab,
    wherein said first tab comes in contact with said second tab set within said pocket,
    wherein said first tab and said second tab shield a gap between said cover and said ground member.

8. The pluggable optical transceiver of claim 1,
    wherein said ground member is made of metal sheet only by cutting and bending without any welding and soldering.

9. The pluggable optical transceiver of claim 1,
    wherein said cover is made of metal sheet only by cutting and bending without any welding and soldering.

10. A pluggable optical transceiver to be set within a cage provided in a host system, comprising:
    a receptacle made of electrically conductive material and including a slope;
    a metal cover including a first bridge in a front end thereof, said first bridge extending in a direction intersecting a longitudinal direction of said optical transceiver; and
    an electrically conductive ground member surrounding a periphery of said receptacle, said ground member including a finger extending in said longitudinal direction and a second bridge connected on a tip of said finger, said second bridge extending in a direction substantially in parallel with said first bridge, said finger including a convexity, said second bridge including a hollow,
    wherein, when said optical transceiver is set within said cage, said convexity comes in contact with an inner surface of said cage, and said hollow comes in contact with said slope and slides thereon, and
    wherein said second bridge is lifted up and comes in contact with said first bridge when said optical transceiver is fully set within said cage.

* * * * *